United States Patent
Farag et al.

(10) Patent No.: US 11,151,789 B1
(45) Date of Patent: Oct. 19, 2021

(54) FLY-IN VISUALIZATION FOR VIRTUAL COLONOSCOPY

(71) Applicant: Kentucky Imaging Technologies, Louisville, KY (US)

(72) Inventors: Aly Farag, Louisville, KY (US); Mostafa Mohamad, Louisville, KY (US); Amal Farag, Louisville, KY (US); Asem Ali, Louisville, KY (US); Salwa Elshazly, Louisville, KY (US)

(73) Assignee: Kentucky Imaging Technologies, Louisville, KY (US)

( * ) Notice: Subject to any disclaimer, the term of this patent is extended or adjusted under 35 U.S.C. 154(b) by 0 days.

(21) Appl. No.: 16/829,967

(22) Filed: Mar. 25, 2020

Related U.S. Application Data

(60) Provisional application No. 62/823,249, filed on Mar. 25, 2019.

(51) Int. Cl.
*G06T 19/00* (2011.01)
*G06T 7/00* (2017.01)

(52) U.S. Cl.
CPC .......... *G06T 19/003* (2013.01); *G06T 7/0014* (2013.01); *G06T 2207/10024* (2013.01); *G06T 2207/30028* (2013.01); *G06T 2210/41* (2013.01)

(58) Field of Classification Search
None
See application file for complete search history.

(56) References Cited

U.S. PATENT DOCUMENTS

| | | | |
|---|---|---|---|
| 6,909,913 | B2 | 6/2005 | Vining |
| 6,928,314 | B1 | 8/2005 | Johnson et al. |
| 7,194,117 | B2 | 3/2007 | Kaufman et al. |
| 7,304,644 | B2 | 12/2007 | Geiger |
| 7,839,402 | B2 | 11/2010 | Dekel et al. |
| 7,853,310 | B2 | 12/2010 | Vining et al. |
| 7,961,187 | B2 | 6/2011 | Borland et al. |
| 8,014,561 | B2 | 9/2011 | Farag et al. |
| 8,041,141 | B2 | 10/2011 | Farag et al. |
| 8,073,226 | B2 | 12/2011 | Farag et al. |
| 8,150,111 | B2 | 4/2012 | Borland et al. |

(Continued)

OTHER PUBLICATIONS

Mohamed, Mostafa & Farag, Amal & Ali, Asem & Elshazly, Salwa & Farag, Aly & Ghanoum, Mohamad. (2018). Fly-In Visualization for Virtual Colonoscopy. 2062-2066. 10.1109/ICIP.2018.8451412.

(Continued)

*Primary Examiner* — Yanna Wu
(74) *Attorney, Agent, or Firm* — Law Office of J. L. Simunic; Joan L. Simunic

(57) ABSTRACT

The present development is a method for the visualization and automatic examination of the inner surface of tubular objects. The method uses a virtual camera rig arranged in a specific pattern within the tubular objects inner surface. The rig can be physical or virtual or hypothetical; graphics-based, providing the same functionality of a sequence of virtual cameras. This "Fly-In" method is a more general visualization technique than techniques of the prior art, it is more flexible and does not create distortion, it does not require alternation to the surface for viewing and it can handle multi-branches with variable diameter. It can also provide a clear assessment of the inner surface for immediate examination of the object.

4 Claims, 9 Drawing Sheets

(56) References Cited

U.S. PATENT DOCUMENTS

| | | | |
|---|---|---|---|
| 8,259,108 B2 | 9/2012 | Suhling et al. | |
| 9,501,709 B2 | 11/2016 | Ikeda | |
| 9,659,405 B2 | 5/2017 | Wahrenberg | |
| 10,242,488 B1 | 3/2019 | Farag et al. | |
| 10,734,028 B2 | 8/2020 | Fay | |
| 2005/0152588 A1 | 7/2005 | Yoshida et al. | |
| 2005/0245803 A1 | 11/2005 | Glenn, Jr. et al. | |
| 2007/0003131 A1 | 1/2007 | Kaufman | |
| 2007/0052724 A1 | 3/2007 | Graham et al. | |
| 2008/0055308 A1 | 3/2008 | Dekel et al. | |
| 2008/0118117 A1* | 5/2008 | Gauldie | A61B 6/032 382/128 |
| 2008/0297509 A1 | 12/2008 | Matsumoto | |
| 2009/0016589 A1 | 1/2009 | Wolf et al. | |
| 2014/0146044 A1* | 5/2014 | Cvetko | G16H 30/40 345/420 |
| 2017/0323431 A1* | 11/2017 | Sarkar | G06T 5/003 |
| 2017/0366814 A1* | 12/2017 | Adsumilli | H04N 19/597 |
| 2019/0005848 A1* | 1/2019 | Kilroy | G06T 3/20 |

OTHER PUBLICATIONS

M. Mohamad, A. Farag, A. M. Ali, S. Elshazly, A. A. Farag and M. Ghanoum, "Enhancing virtual colonoscopy with a new visualization measure," 2018 IEEE 15th International Symposium on Biomedical Imaging (ISBI 2018), Washington, DC, 2018, pp. 294-297, doi: 10.1109/ISBI.2018.8363577.

\* cited by examiner (a)

(b)

(a)

(b)

FLY-IN VISUALIZATION FOR VIRTUAL COLONOSCOPY

CROSS-REFERENCE TO PRIOR APPLICATIONS

The present application claims priority to U.S. 62/823,249, filed 25 Mar. 2020, which is incorporated herein in its entirety by reference.

GOVERNMENT INTEREST

This invention was made with government support under grant numbers NIH 1R43CA179911-01 awarded by the National Institutes of Health and NSF U.S. Pat. No. 1,602,333 awarded by the National Science Foundation. The government has certain rights in the invention.

FIELD OF THE INVENTION

The invention relates to a virtual visualization method for visualization of the inner surfaces of tubular objects.

BACKGROUND OF THE INVENTION

Visualization of the inner surface of tubular objects is a necessary and common practice for numerous applications ranging from hose systems in industrial environments to examination of water supply, waste and sewage systems, to vessels and virtual colonography in medicine. These tubular shapes can have known dimensions, e.g., industrial parts, thus their 3D representation will be known a priori, such as through their Computer Aided Design (CAD) blueprints. On the other hand, for structures that are inferred through sensors and are reconstructed numerically by computer models, such as underground reservoirs of water and oil, caves, anatomical models of the human body, the 3D representation must be generated through manipulating the sensory information by various known techniques in the image analysis and computer vision literature.

In biomedical applications visualization is often part of a multistage system that uses sensors to extract data from the object e.g., a part of the human body, from which methodologies are applied to build a three-dimensional (3D) description of the topology of interest. Over the past four decades, computerized biomedical imaging modalities such as positron emission tomography (PET), magnetic resonance imaging (MRI) and computed tomography (CT) have evolved to enable precise 3D modeling of the human anatomy. Because of the wide-spread adoption of these imaging modalities in diagnosis, surgery and treatment, which generated enormous datasets and case studies, the need exists for efficient means to visualize and manipulate. Specifically, for Computed Tomography Colonography (CTC), an abdominal CT scan of prepped patients is performed, from which a 3D model is generated. In order to better differentiate polyps from pseudo polyps in the lumen, and to better view the lumen surface in the presence of fluid residues, it is common practice to obtain two CT scans of the patient, one with the patient in the supine position and one in the prone position. In some cases, a decubitus scan is performed as well. Thus, two and up to three 3D models could be generated per one CT scan of a prepped patient for CTC. More recently, the computed tomography colonography (CTC) visualization Fly-Through (FT) and Fly-Over (FO) methods provide two distinct approaches for visualization of the tubular object, starting from the centerline/medial axes. In the FT technique, a virtual camera with a specific field of view moves along a special planned path inside the colon to render its internal views. However, due to the complexity of the colon surface, there is a percentage of the surface missed by a unidirectional FT. Therefore, to examine the entire colon, FT must be performed in both antegrade and retrograde directions for each patient dataset. Thus, a total of at least two and up to six Fly-Throughs is conducted, with models generated from the supine, prone, and if conducted, decubitus CT scans, which can be a tedious and time-consuming endeavor. The Fly-Over (FO) method divides the colon into two opposite halves and then assigns a virtual camera to each half. Then, each camera follows its perspective centerline for each of the two halves. The FO technique solved some of the problems in the FT, such as better visualization of the surface that requires only one planned path through the surface, yet introduced different problems with respect to how the colon is to be divided and how to choose the optimal view for the cameras.

Several visualization techniques have been proposed, including the use of colon flattening and panoramic views. The common drawbacks of all panoramic Fly-Through methods consist of the fact that polyps behind haustral folds, the areas of high curvature or severe bending along the surface, can be easily overlooked. Since flattening methods are based on geometric mapping, geometric distortion will occur.

The present invention is a method that uses a virtual camera rig arranged in a specific pattern within a tubular object's inner surface. For use herein, the method is referred to as a "Fly-In" method, or "FI". The Fly-In method may be used for reconstruction of the tubular network or through using an inner robotic-like inspection system when the inner surface is known a priori. Further, the Fly-In method may be used for visualization of any biomedical tubular topology such as the brain vascular tree, the trachea and colon.

The novel Fly-In method conforms to the need for better visualization and is very adaptable to the avalanche of improvements in computer and information technology. This yields benefits in a number of important aspects. For example, Fly-In provides faithful mapping from 3D into undistorted 2D representation that conveys the content of the inner object fits observation on computer screens. Secondly, in medicine, radiologists can navigate the data in 3D for diagnosis, while the surgeon can obtain more accurate 3D representation in image-guided surgeries and pre-surgical models.

SUMMARY OF THE PRESENT INVENTION

The present development is a new visualization method for visual and automatic examination of the inner surfaces of tubular objects. The approach uses virtual camera rig arranged in a specific pattern within the tubular object's inner surface and is referred to herein as "Fly-In" or "FI". This rig can be physical or virtual or hypothetical, graphics-based, and providing the same functionality of a sequence of virtual cameras.

In an exemplary application, Fly-In uses a virtual camera that moves along an inner surface's centerline or medial axes of a three-dimensional (3D) tubular object, obtaining projections of the surrounding view, formed of small 3D topological rings, within the tubular object that is rendered as a two-dimensional (2D) rectangular image. Fly-In is more flexible than prior art visualization methods and does not create distortion. It does not require alteration to the surface for viewing and it can handle multi-branches with variable diameter. It can also provide a clear assessment of the inner surface for immediate examination of the object.

Along with the mechanism of the Fly-In process, a new visualization loss measure, referred to herein as VLM, is also presented, which utilizes the projection direction of the camera optical axis, the surface normal and the ratio of the camera focal length and the surface distance. The loss measure presents a color-coding for the visualized surface, thus providing a "visual" representation of what is seen by the camera rig. The VLM facilitates the evaluation of various visualization methods. A comparative study of the Fly-In technique versus the prior art Fly-Through and Fly-Over methods demonstrate that Fly-In is superior to prior art methods because it is more flexible and does not create distortion, it does not require alteration to the surface for viewing and it can handle multi-branches with variable diameter. It can also provide a clear assessment of the inner surface for immediate examination of the object.

DETAILED DESCRIPTION OF THE PRESENT DEVELOPMENT

The present development is a new visualization method for visual and automatic examination of the inner surfaces of tubular objects. The new three-dimensional (3D) visualization method is referred to herein as the Fly-In or FI approach. A series of equations are used to establish a correspondence between the 3D inner surface and the 2D representation from basic optical imaging foundation. The Fly-In approach has the ability to map the 3D representation of a ring into a distortionless sheet or filet keeping the characteristics of the texture of the inner object. The Fly-In approach can be used to calculate a visualization loss measure (VLM) that can be used with a color-coded display to indicate what is visible in the inner surface by the visualization methods. The Fly-In approach has the capability of automatic surface inspection using the 2D distortionless representation, and can be used in a variety of applications.

The following description is intended to provide the reader with a better understanding of the invention. The description is not intended to be limiting with respect to any element not otherwise limited within the claims. A quantitative analysis versus two prior art computed tomography colonography (CTC) visualization methods, Fly-Through (FT) and Fly-Over (FO), is included for comparison purposes only. The Fly-In approach is described within the context of geometric computer vision which enables several applications in autonomous navigation and human/automatic inspection of tubular objects. For the sake of demonstration and comparing with current visualization approaches, Fly-In will use the virtual colonoscopy application as an illustrative example. Fly-In and VLM can be applied to any tubular topology where the visualization is performed by human or automatically.

Fly-In Visualization: The Fly-In approach uses a centerline/medial axis as a datum for visualization. Methods to extract the centerline/medial axis of tubular shapes is known in the art. More specifically, the Fly-In approach uses the centerline as starting point, even though the methodology can tolerate cases of disconnected and of distorted tubular objects.

Figure 1:
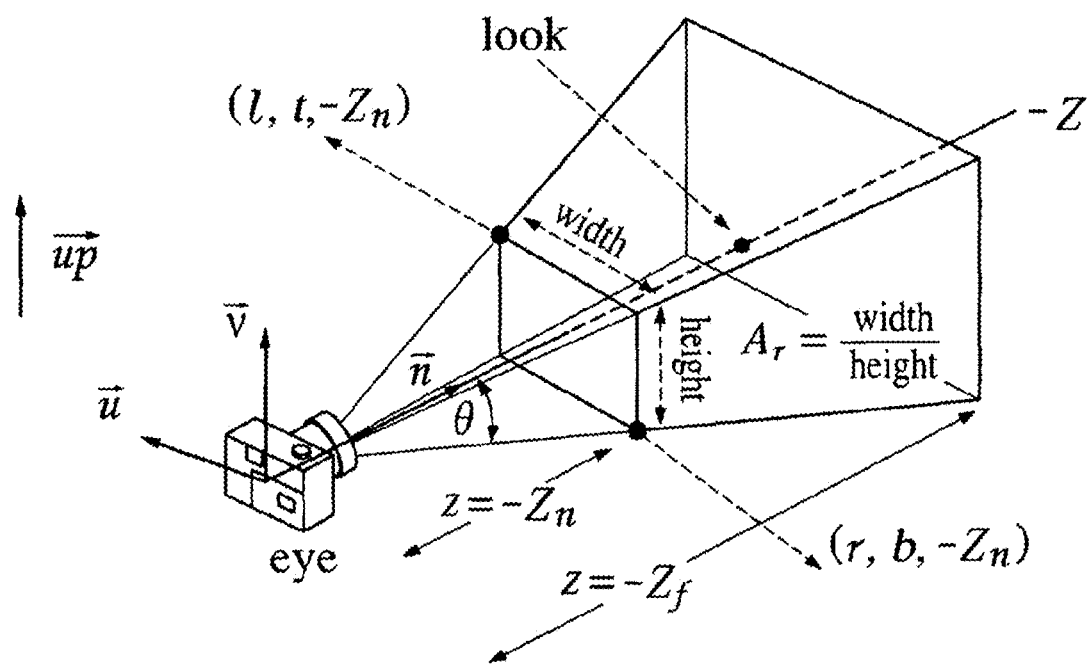
FIG. 1 is an illustration depicting the frustum of virtual camera.

Perspective Camera Characteristics: FIG. 1 shows the pyramid visualization frustum of a typical virtual camera, in which all light rays go through a common point which is the center of projection. Four camera parameters determine a unique pose of the camera and the corresponding image: (1) the camera location or position vector, (2) a look-at vector or view directions referring to the line of sight, (3) view-up vectors referring to upper direction of image acquired from a camera or displayed on the screen, and (4) the vertical field of view or FOV, θ.

The centerline or medial axis is considered optimum camera position for efficient and comfortable navigation. The camera is positioned at some point in space, and its viewing volume is a portion of a rectangular pyramid, with an apex located at the camera position. The opening of the pyramid is set by the vertical FOV angle θ. Two planes are defined perpendicular to the pyramid's axis: the near plane $Z_n$ and the far plane $Z_f$. The part of the pyramid enclosed by the two planes is called the viewing volume or frustum. The ratio between the width and the height of the image plane or what the virtual camera sees is the aspect ratio $A_r$.

Figure 2:
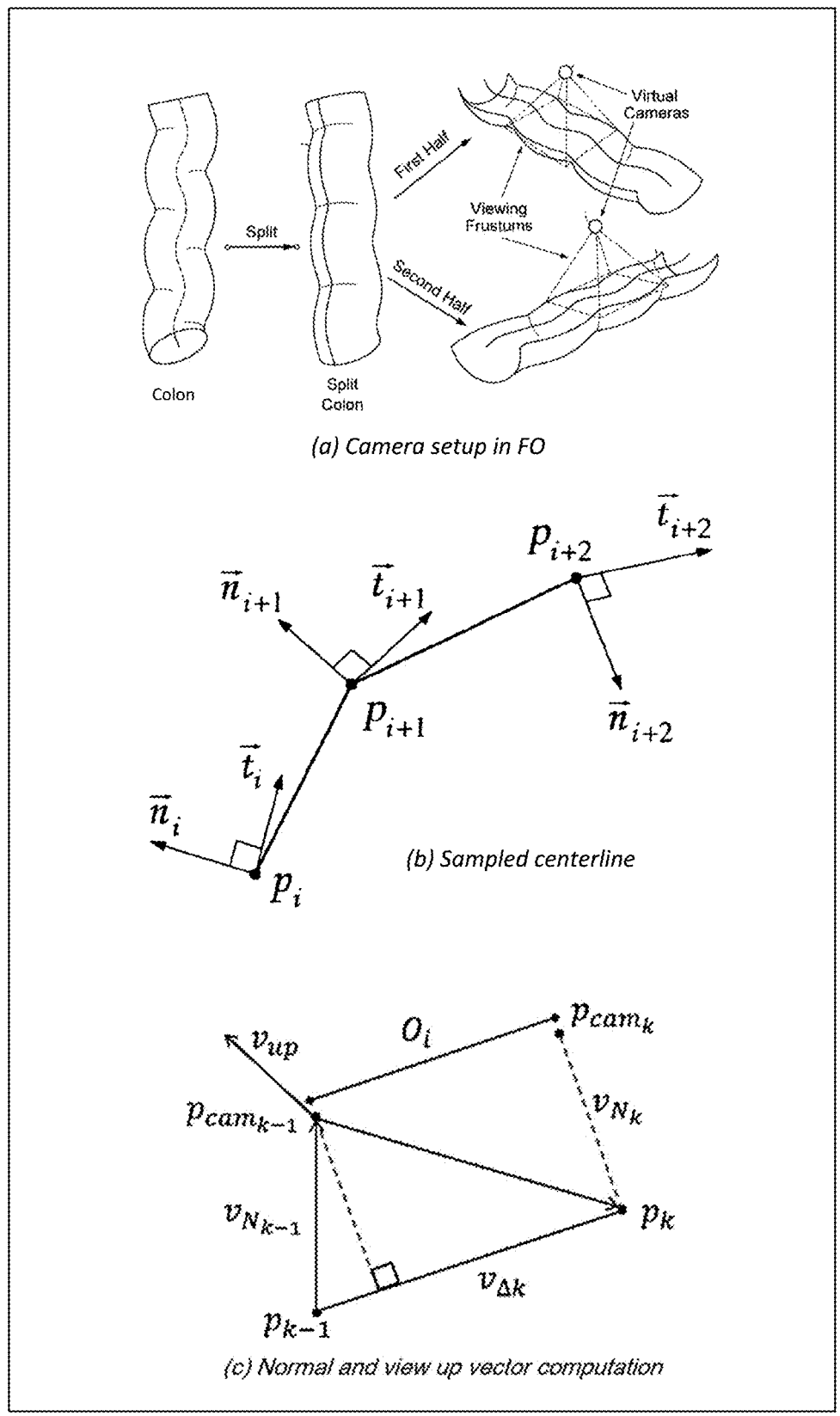
FIG. 2 is an illustration demonstrating visualization using the Fly-Over or FO approach with the cameras normal to centerline, wherein (a) shows the camera setup, (b) shows the sampled centerline, and (c) shows the normal and view up vector computation.

In the prior art Fly-Over approach, a virtual camera is used for each half of the tubular object, i.e., the tube is sliced into exactly two halves and each is visualized by a virtual camera perpendicular to the centerline. As shown in FIG. 2, the orientation of each camera is controlled by the four parameters described above: camera position vector; look-at vector, which describes the direction that the camera is pointing (direction of projection); view-up vector; and the vertical FOV angle, $$\theta = 2\tan^{-1}\left(\frac{\text{height}}{2Z_n}\right),$$

which describes how much of the scene is fit into the viewing volume. The look-at vector at each point $p_i$ of the center line of the colon for the two halves generated in FO are given by:

$$\overrightarrow{\text{look}}_{i,1} = \vec{t}_i \times \vec{n}_i \text{ and } \overrightarrow{\text{look}}_{i,2} = -\overrightarrow{\text{look}}_{i,1} \quad \text{Eq. (1)}$$

respectively. The camera position and view-up vectors of each half are given by the following equations, $$\overrightarrow{pos}_{i,1/2} = p_i + h_i \frac{\overrightarrow{\text{look}}_{i,1/2}}{\|\overrightarrow{\text{look}}_{i,1/2}\|} \text{ and } \overrightarrow{up}_{i,1/2} = \vec{n}_i \quad \text{Eq. (2)}$$

where, $h_i$ is the camera elevation from each centerline point $p_i$. During centerline extraction, each point $p_i$ encodes its distance from the colon's boundary $D(p_i)$. By making $p_i$ is the image of the optical center on the image plane, then the elevation of the camera $h_i$ at each point $p_i$, which maximizes surface visibility coverage while maintaining the same angle $\theta$, is given by:

$$h_i = \frac{D(p_i)}{\tan(\theta/2)}.$$

The visibility coverage is controlled by the camera position through its elevation $h_i$.

Approximation of Fly-In using perspective cameras: However, with the Fly-Over approach there is still some perspective distortion in the generated images. Increasing the number of virtual cameras (m cameras) and adjusting the positions and orientations of these cameras is expected to reduce the distortion. This is achieved by:
 a) allowing the cameras to change positions and eliminating the need for cutting the tubular object into two halves, hence, assuming the camera's optical center is at point $p_i$, with $h_i$=0 in Eq. (2);
 b) using multiple identical virtual cameras instead of only two cameras so the look-at vector of one of these cameras at point $p_i$ is given by $\overrightarrow{\text{look}}_{i,1} = \vec{t}_i \times \vec{n}_i$ and the other look-at vectors are located on the same plane and the angle between each two vectors is $$\alpha = \frac{360°}{m};$$

and,
 c) to automatically stitch the images of these cameras, all the cameras have the same view-up vectors $\overrightarrow{up}_{i,m} = \vec{t}_i$ and each camera has a horizontal FOV angle $\alpha$.

Figure 3:
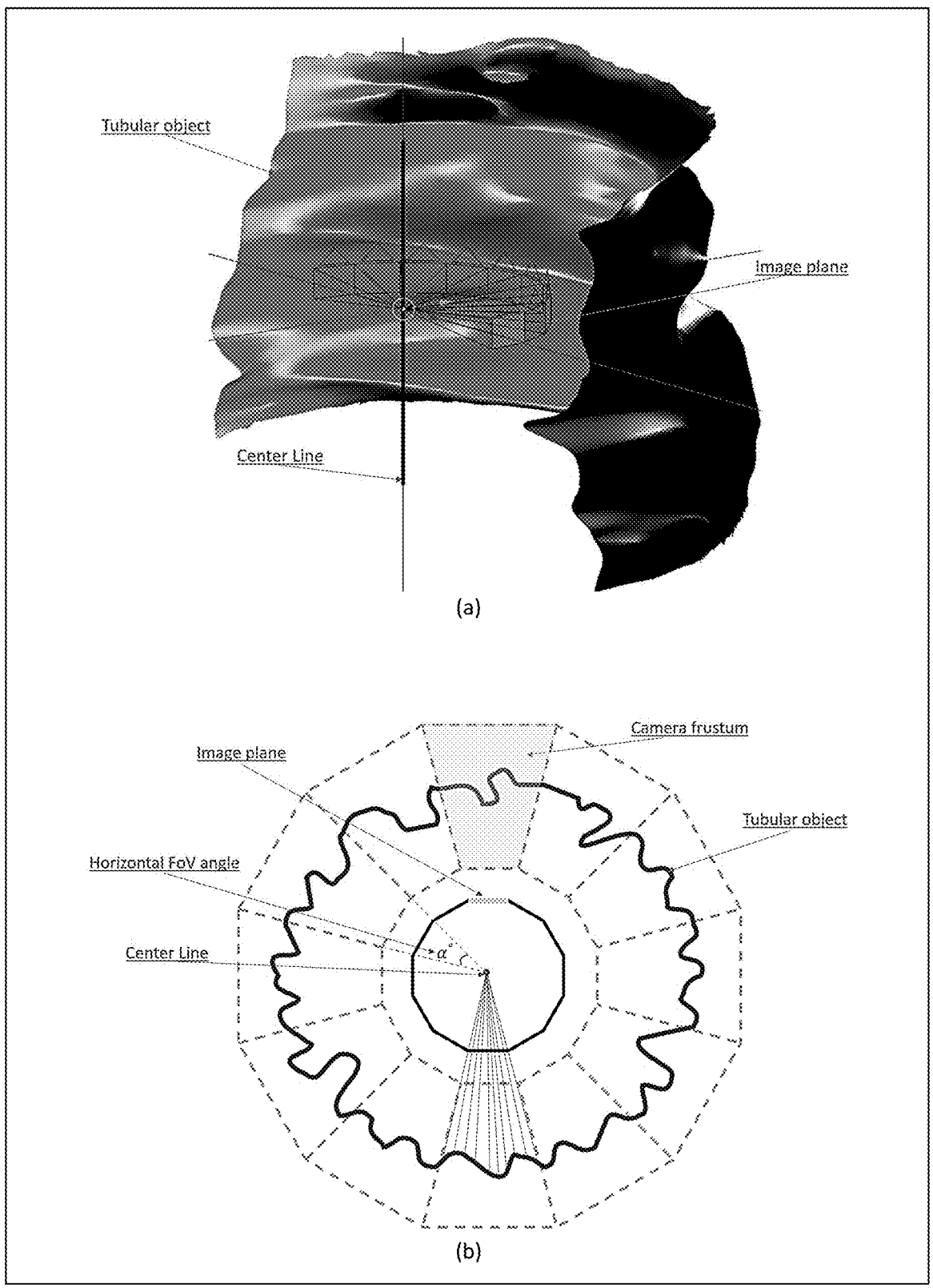
FIG. 3 is an illustration showing two different views of the Approximated Fly-In configurations, wherein (a) illustrates the positioning of one camera within a tubular structure with a vertical centerline and (b) is a cross-sectional view of the tubular structure of FIG. 3(a) showing the position of the camera and the views from that camera.

FIG. 3 illustrates the positioning of one camera within a tubular structure with a vertical centerline (a) and a cross-sectional view of the tubular structure showing the position of the camera and the views from that camera.

Ideal Fly-In model: It is possible to obtain acceptable images using as few as four (4) virtual cameras for the Fly-In model. However, increasing the number of cameras reduces the output distortions. In a preferred embodiment, at least twenty (20) cameras are used. The extreme limit of the increasing sequence of camera configurations is to use an equirectangular projection to map each cell on the 3D surface to a rectangular image. Therefore, the most preferred Fly-In method uses an equirectangular virtual camera that moves along the centerline/medial axes. In the pre-rendered cylindrical object configuration, a virtual equirectangular camera located at each point $p_i$ of the center line of a tubular object is used and its look-at vector is $\overrightarrow{\text{look}}_i = \vec{t}_i \times \vec{n}_i$. The camera view-up vector is $\overrightarrow{up}_i = \vec{t}_i$.

Figure 4:
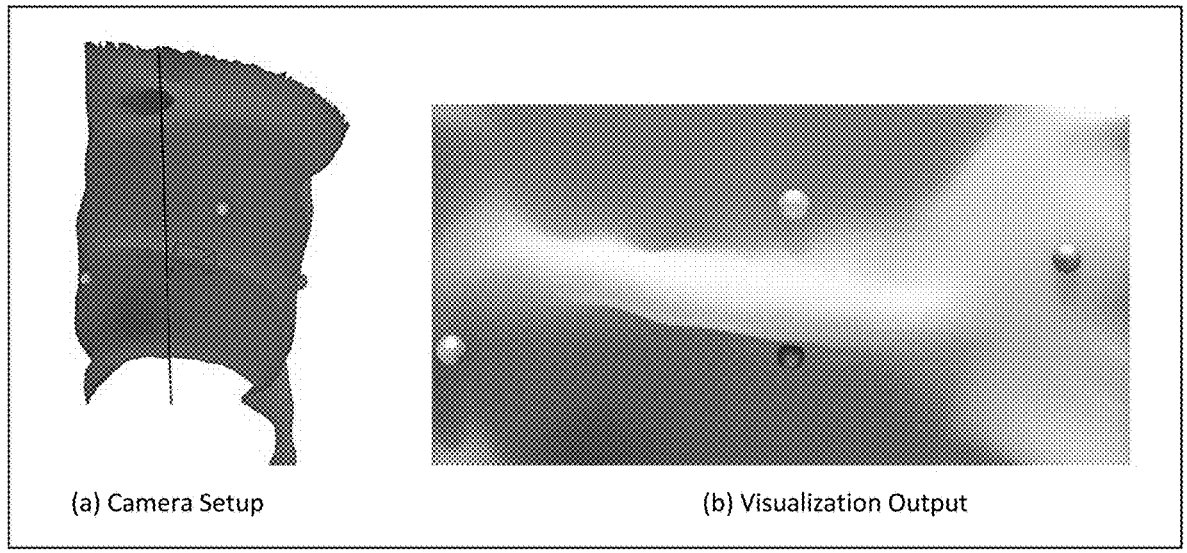
FIG. 4 is an illustration of (a) the camera setup for the Fly-In visualization, and (b) the visualization output showing no distortion.

FIG. 4(a) is an illustration of a segment of the human colon with one virtual camera positioned for Fly-In visualization. In a preferred embodiment, a plurality of virtual cameras is used simultaneously. In a most preferred embodiment, a sufficient number of virtual cameras are used to approximate the output from the equirectangular camera. FIG. 4(b) is the visualization output showing no distortion. The visualization is rendered using Blender open source software system. As is known in the art, distortion may result if there is a nonlinear relation between the z-coordinate of a point and its angle $$\gamma = \tan^{-1}\left(\frac{z}{r}\right).$$

The distortion can be reduced by increasing the number of cameras which reduces the width each camera must cover and thereby minimizes the differentials in projected distances.

Figure 5:
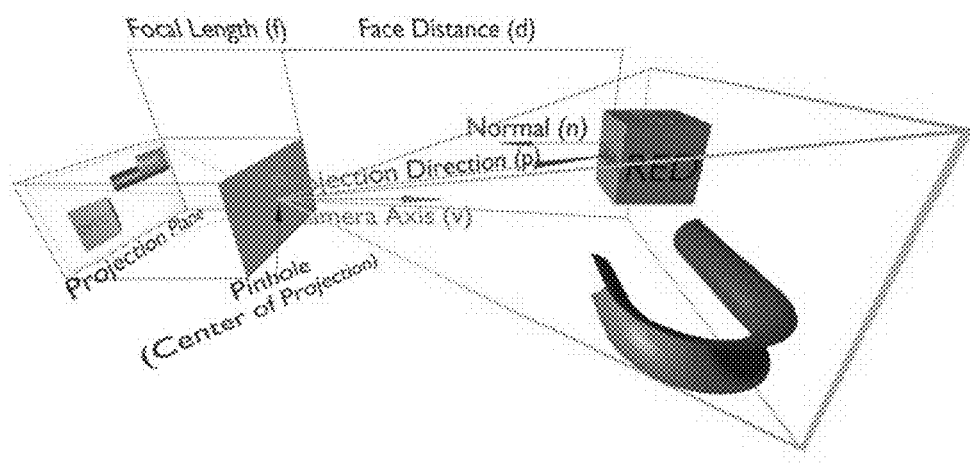
FIG. 5 is an illustration showing the factors upon which the visualization quality of a surface depends.

Visualization Loss Measure (VLM): The 3D surface is assumed to consist of a mesh of polygon faces, each of which is also referred to as a "cell". Referring to FIG. 5, three factors are used to define the visualization loss measure ($L_v$) for one face (cell) using a perspective camera: projection direction $\vec{p}$ angle with camera axis $\vec{v}$; projection direction $\vec{p}$ angle with face normal $\vec{n}$; and, face distance (d) ratio to the camera focal length (f). The vector from the camera origin to the cell $c_i$ center is defined by $\overrightarrow{p(c_i)}$ and $\overrightarrow{n(c_i)}$ as the normal for the same cell because the projection direction and the normal vector are different for each cell. Given the normalized vectors $\overrightarrow{p(c_i)}$, $\vec{v}$ and $\overrightarrow{n(c_i)}$, the loss measure $L_v$ for a cell $c_i$ is given by Equation 3:

$$L_v(c_i) = 1 + g\left(\frac{f}{d(c_i)}\right)\left(\overrightarrow{p(c_i)} \cdot \vec{v}\right)\left(\overrightarrow{p(c_i)} \cdot \overrightarrow{n(c_i)}\right) \quad \text{Eq. (3)}$$

where the symbol (•) is the dot product, $d(c_i)$ is the distance between the cell $c_i$ center and the camera. $g(x)$ is a function defined by Equation 4:

$$g(x) = \begin{cases} x, & x < 1 \\ 1, & x \geq 1 \end{cases} \quad \text{Eq. (4)}$$

Note that d and f are $$g\left(\frac{f}{d}\right)$$

distances and are positive in the range [0, 1]. Since $\vec{p}$, $\vec{v}$ and $\vec{n}$ are normalized, then the range for $(\overrightarrow{p(c_i)} \cdot \vec{v})$ is [0, 1] and the range for $(\overrightarrow{p(c_i)} \cdot \overrightarrow{n(c_i)})$ for visible faces is [−1,0]. If d>f then the surface will be smaller than its original shape. Thus, the value $$\frac{f}{d}$$

is used to represent the optimal viewing distance. The term $(\overrightarrow{p(c_i)} \cdot \vec{v})$ represents the angle between the frontal camera direction and the surface location. This term becomes 1 if the surface is exactly in front of the camera (i.e. $\overrightarrow{p(c_i)}$ is perpendicular to the cell $c_i$) and decreases till reaches 0 when the cell $c_i$ is parallel to the camera axis $\vec{v}$.

The third term $(\overrightarrow{p(c_i)} \cdot \overrightarrow{n(c_i)})$, represents the rotation of the surface compared to the direction of the projection. The best value for the third term is −1 when the surface normal is exactly opposite to the projection direction. Multiplying the three factors and adding one makes the measure $L_v$ having the range [0,1]. $L_v=0$ means there is no loss in visualization while $L_v=1$ represents complete loss in visualization due to lack in one of the previous factors. For the purpose of complete graphical comparison, the visualized surface is defined as a percentage using the cumulative normalized function $F_{L_v}$ as follows:

$$F_{L_v}(x) = \frac{\sum_{i=1}^{N} u(x - L_v(c_i))}{N}, \quad 0 \leq x \leq 1 \quad \text{Eq. (5)}$$

Overall, the visualization quality was only measured by the percentage of cells less than each VLM value.

Figure 6:
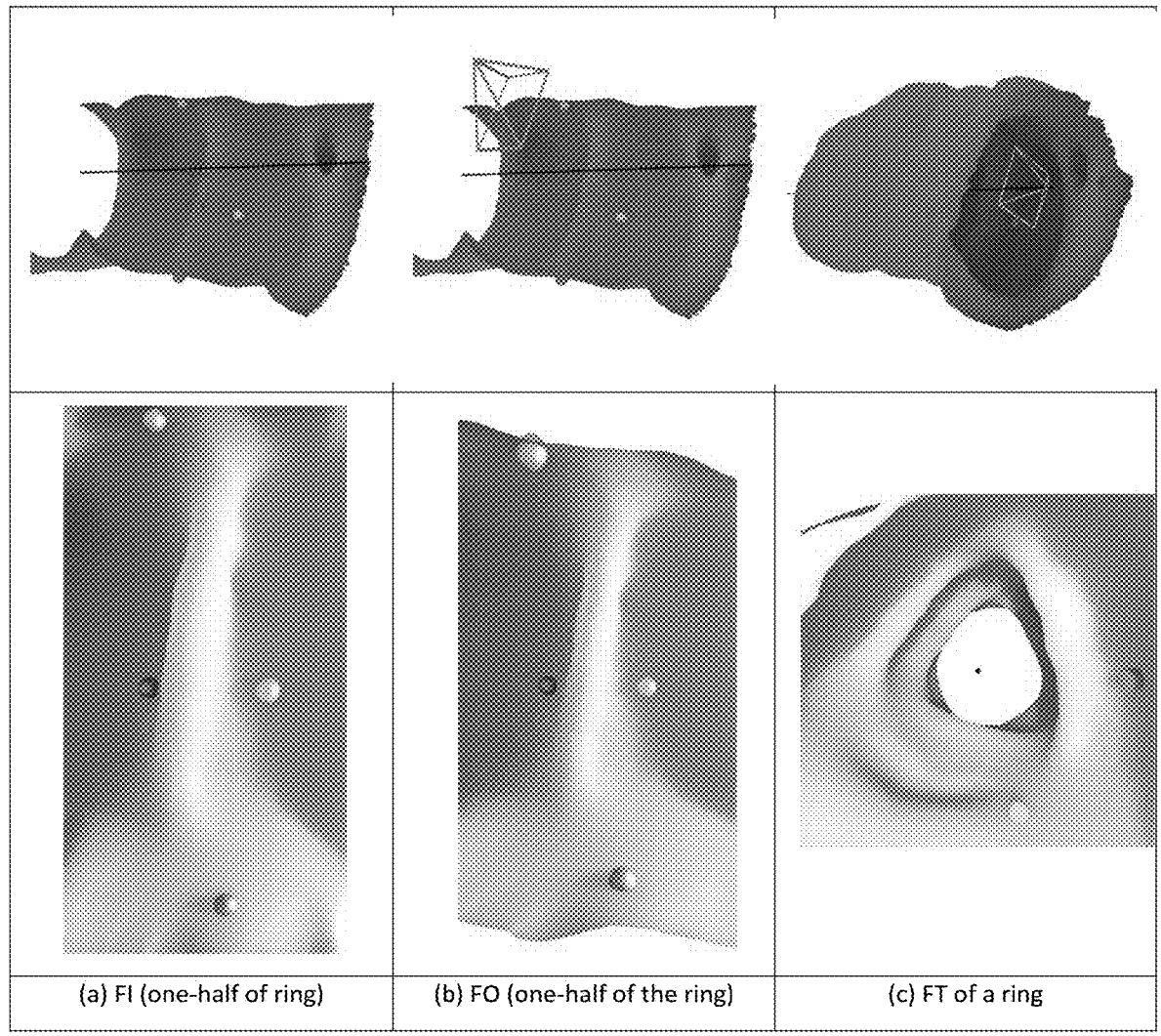
FIG. 6 is an illustration of the visualization of a segment of the human colon wherein (a) shows visualization of one-half of a ring using the Fly-In approach of the present invention, (b) shows visualization of one-half of a ring using the Fly-Over approach, and (c) shows visualization of a ring using the Fly-Through approach.

Comparison to Output from FT and FO: Experimental results using Fly-In vs FT and FO to examine 12 cases for real computed tomography colonography (CTC) were obtained. The data was segmented, 3D models were generated and the centerlines were obtained using the method of Hassouna and Farag. To highlight the ability of the Fly-In to visualize the small polyps a second experiment was conducted by visual comparison between the three methods on a small colon section as shown in FIG. 6. As shown in FIG. 6, four spheres of essentially the same size are added inside the colon section to represent synthetic polyps. The visualization results show that FO can easily visualize the 4 spheres in one pass. However, a slight distortion of the spheres towards the sides of the colon can be seen. The FT method cannot visualize the 4 spheres in one pass and required a secondary pass in the opposite direction to correct the visualization limitation. The Fly-In successfully solved both problems by visualizing the 4 spheres with relatively similar size, that is with no distortion.

Figure 7:
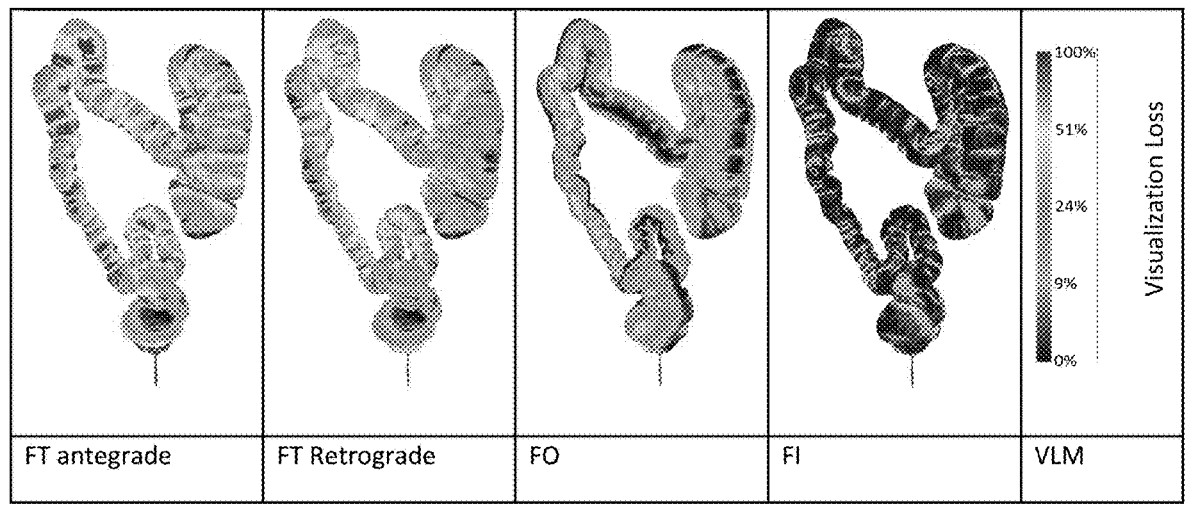
FIG. 7 is an illustration of the visualization of a segment of the human colon using heat-map coloring based on a log scale for the purpose of visualization, wherein. blue represents 0% loss in visibility and red represents 100% loss visibility.
Figure 8:
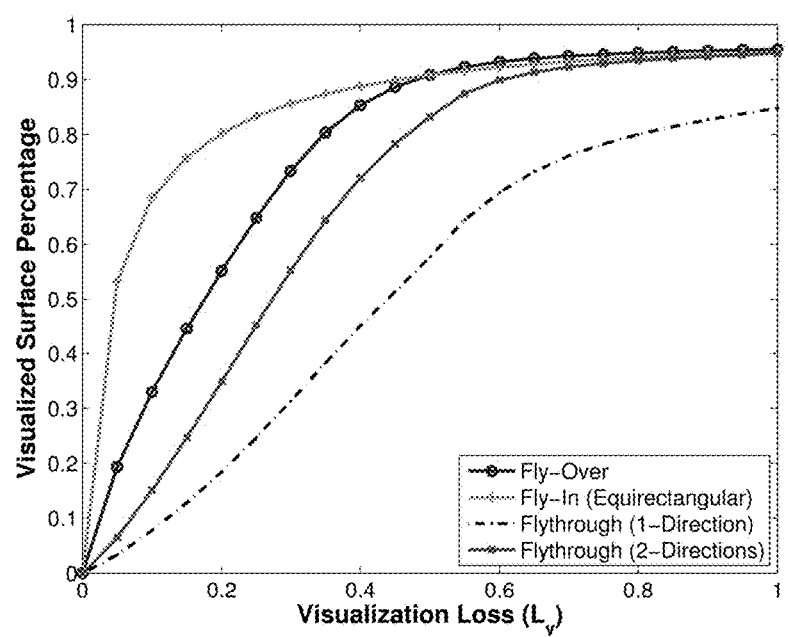
FIG. 8 is a graphical representation showing the visualization loss for different visualization approaches.

For visual evaluation purposes, the loss measure is viewed as a color-coded heat-map, which can be displayed as either grayscale or RGB, as shown in FIG. 7. The basic technology for generating color-coded heat maps is known in the art. In the present application, the individual visualization values $L_v$, provides a 3D color coded colon model representing areas of high visualization or close to 0% loss in visibility as shown in blue in FIG. 7, and areas of low visualization or close to 100% loss in visibility as shown in red in FIG. 7, with color gradations along the loss in visibility scale. The specific color choices for the scale are not limited provided a color code is included with the results. Using the color coding a user can easily see the colon areas where the visualization method had difficulties in accurately visualizing the colon surface, for example the red areas indicating high loss in visualization in FIG. 7.

Figure 9A:
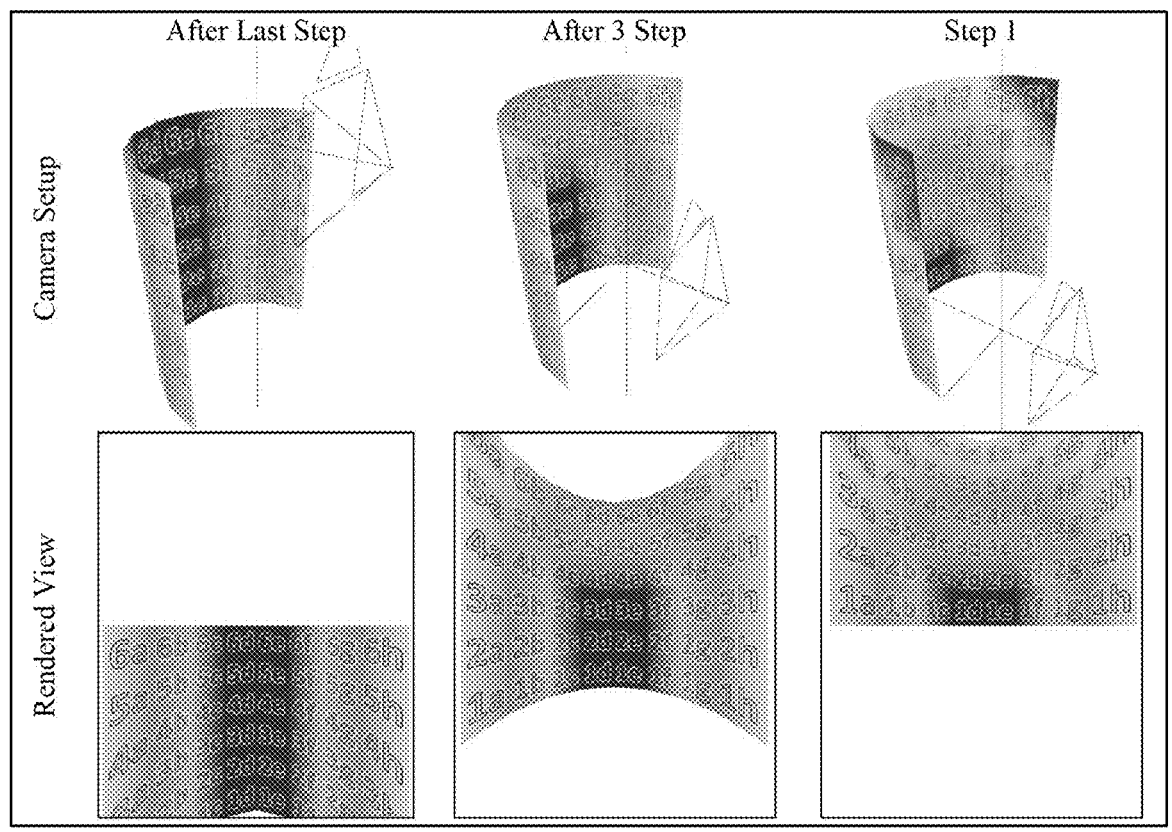
FIG. 9 is an illustration for visualizing the inner surface of a cylinder, showing the camera set up and rendered view for (a) the Fly-Over approach, and (b) the Fly-In approach.
Figure 9B:
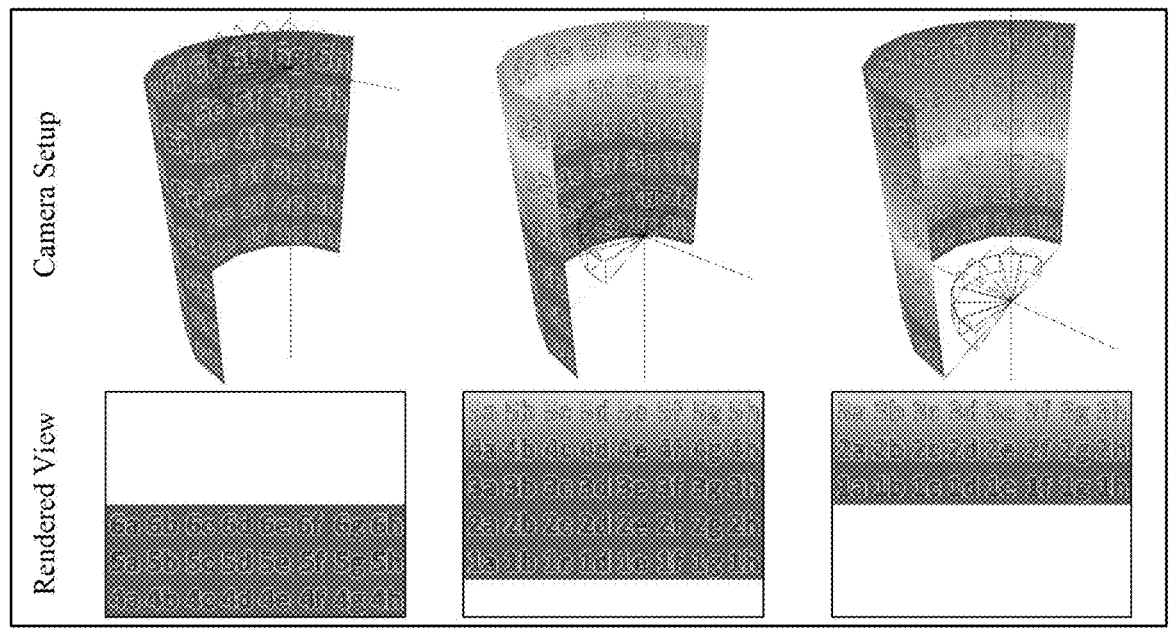

The average visualization loss $L_v$ of the 12 real colon cases was compared for three approaches: Fly-In, FO and FT, both one direction and in two directions (antegrade and retrograde). As shown in FIG. 9, the Fly-In method provides overall better visualization than the other methods for $L_v < 0.5$.

Figure 10A:
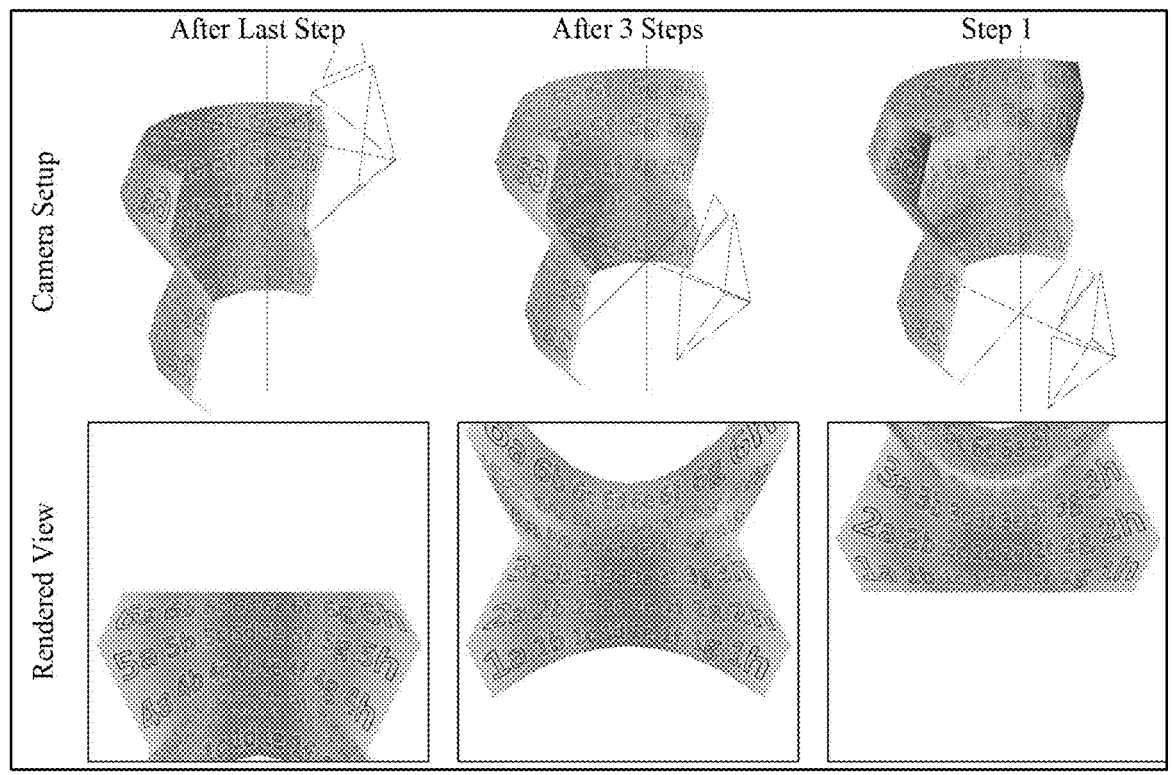
FIG. 10 is an illustration for visualizing the inner surface of a deformed cylinder, showing the camera set up and rendered view for (a) the Fly-Over approach, and (b) the Fly-In approach.
Figure 10B:
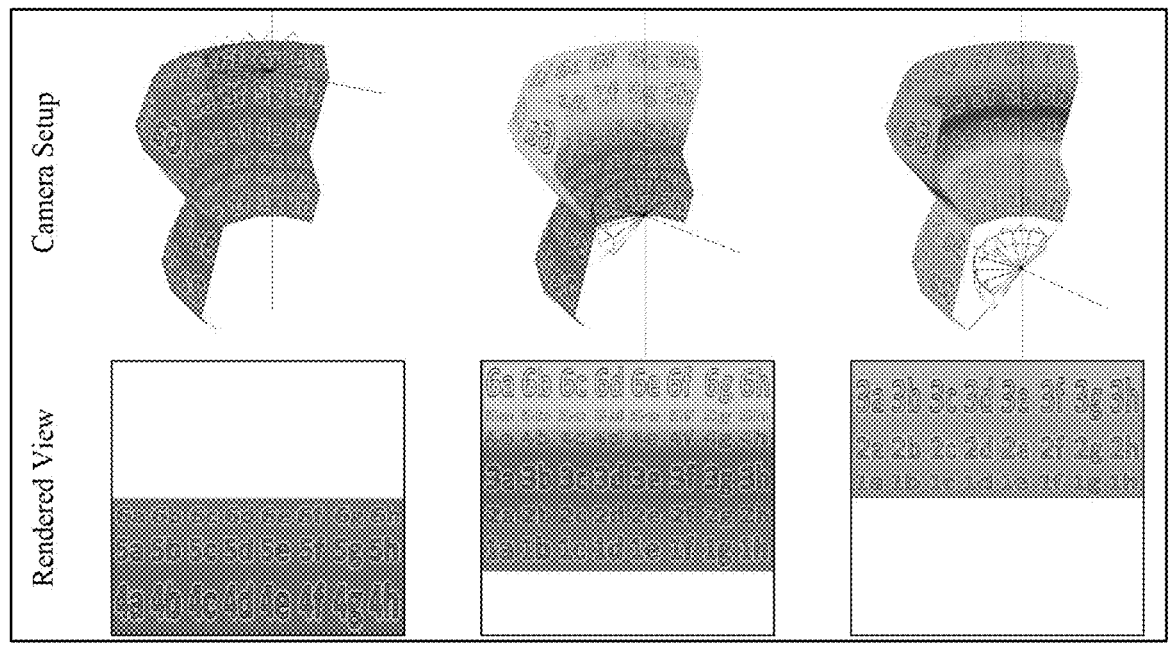

FIGS. 9 and 10 compare the results for the visualization of section of an inner surface of a simple cylinder and a deformed cylinder, respectively, using either the Fly-In method or the prior art Fly-Over method with the virtual camera at three different positions. Both examples show that distortion is observed using the Fly-Over method in the regions far away the optical axis, whereas the Fly-In method does not induce any distortion.

Figure 11:
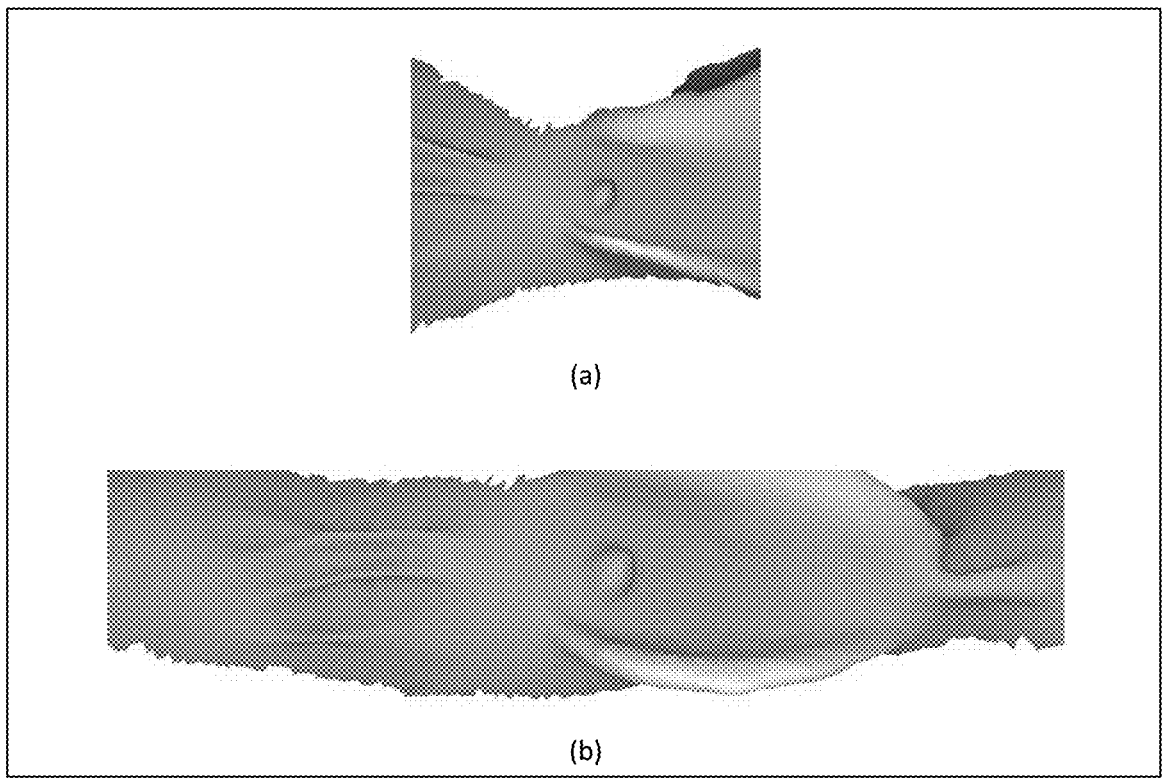
FIG. 11 is a visualized image of a polyp within a colon section wherein the polyp is facing the center of the projection (a) shows a half-colon ring visualized using Fly-Over where the polyp is in front of the camera; and (b) shows a full-colon ring visualized using Fly-In where is the polyp is in the center of the view; and, FIG. 12 is a visualized image of a polyp within a colon section wherein the polyp is not facing the center of the projection (a) shows a half-colon ring visualized using Fly-Over where the polyp is in front of the camera; and (b) shows a full-colon ring visualized using Fly-In where is the polyp is in the center of the view.
Figure 12:
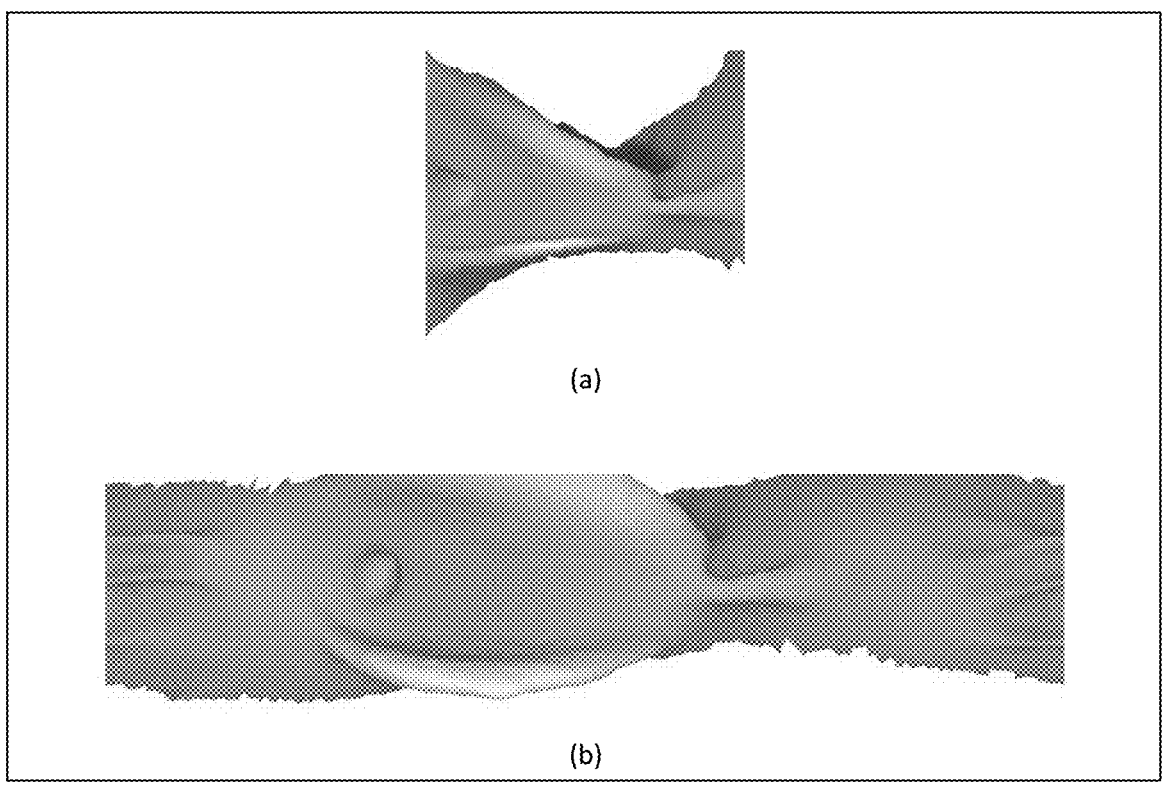

FIGS. 11 and 12 show images of polyp visualization in a section of the human colon for polyps in front of the camera and far from the optical centers, respectively, using the prior art Fly-Over method and the inventive Fly-In method. Although there is not a significant difference between the methods in visualization of the polyps when the polyps are directly in front of the camera, when the polyp is displaced from the optical center deformation of the polyp is observed using the prior art Fly-Over method whereas essentially no deformation is noted using the inventive Fly-In method.

The present invention is a novel Fly-In visualization approach and a visualization loss measure (VLM), for visualizing, and color-coding the quality of visualization, of the inner surface of tubular objects. Comparisons of the Fly-In method to the prior art Fly-Over and Fly-Through visualization methods demonstrates that the Fly-In method results in more comprehensive visualization of the inner surfaces of tubular objects than the prior art methods and that the results from the Fly-In method have less distortion or deformation than results using the prior art methods. Fly-In is adaptable to human and automatic visualization, and can be incorporated in autonomous robotic systems for inspection of complicated tubular grid.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted. The terms "a", "an", and "the" refer to "one or more" when used in the subject specification, including the claims.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed application.

The present application incorporates herein in their entirety U.S. Pat. No. 8,014,561; "Enhancing virtual colonoscopy with a new visualization measure", ISBI 2018: 294-297; and, "Fly-In Visualization for Virtual Colonoscopy" 25th IEEE International Conference on Image Processing (ICIP), pp. 2062-2066 (2018).

What is claimed is:

1. A method for using a virtual visualization technique to generate a three-dimensional image of an interior surface of a tubular object, the method comprising:
    a) providing a tubular object wherein the tubular object defines an interior surface and a medial axis;
    b) providing at least four virtual cameras, wherein each virtual camera is positioned at a predetermined coordinate site along the medial axis of the object, and wherein each virtual camera is directed toward a predetermined section of the interior surface of the tubular object, wherein the predetermined section is specific for each virtual camera;
    c) having each virtual camera capture an image of the predetermined section of the interior surface of the tubular object and convert the image to a 2D rectangular image;
    d) rotating each virtual camera on the medial axis;
    e) repeating steps (c) and (d) to capture a plurality of images for the entire circumference and length of the object;
    f) consolidating the plurality of images to define a three-dimensional image wherein the interior surface of the tubular object is visualized;
    g) defining the three-dimensional image in terms of a mesh of polygon faces, wherein each face is a cell having a cell center $c_i$;
    h) calculating a visualization loss measurement value, $L_v$, wherein $$L_v(c_i) = 1 + g\left(\frac{f}{d(c_i)}\right)(\overrightarrow{p(c_i)} \cdot \vec{v})(\overrightarrow{p(c_i)} \cdot \overrightarrow{n(c_i)})$$

wherein $d(c_i)$ is a distance between a cell $c_i$ center and a virtual camera capturing the image, $g(x)$ is a function defined as $$g(x) = \begin{cases} x, & x < 1 \\ 1, & x \geq 1 \end{cases}$$

and $\overrightarrow{p(c_i)}$, $\vec{v}$ and $\overrightarrow{n(c_i)}$ are normalized vectors and $(\overrightarrow{p(c_i)} \cdot \vec{v})$ represents the angle between the virtual camera direction and the interior surface and $(\overrightarrow{p(c_i)} \cdot \overrightarrow{n(c_i)})$, represents a rotation of the interior surface compared to a direction of a projection, and wherein $L_v < 0.5$.

2. The method of claim 1 wherein at least twenty virtual cameras are positioned at predetermined positions along the medial axis.

3. The method of claim 1 wherein each virtual camera is a virtual equirectangular camera.

4. The method of claim 1 wherein the visualization loss is converted to a color-coded image.

* * * * *